US011787982B2

United States Patent
Arzt et al.

(10) Patent No.: US 11,787,982 B2
(45) Date of Patent: Oct. 17, 2023

(54) STRUCTURE WITH IMPROVED ADHESION (71) Applicant: INNOCISE GmbH, Saarbrücken (DE)

(72) Inventors: Eduard Arzt, Saarbrücken (DE); René Hensel, Saarbrücken (DE); Karsten Moh, Blieskastel-Brenschelbach (DE); Verena Nicola Tinnemann, Leverkusen (DE)

(73) Assignee: INNOCISE GmbH, Saarbrücken (DE)

( * ) Notice: Subject to any disclaimer, the term of this patent is extended or adjusted under 35 U.S.C. 154(b) by 335 days.

(21) Appl. No.: 16/957,780

(22) PCT Filed: Dec. 18, 2018

(86) PCT No.: PCT/EP2018/085499
§ 371 (c)(1),
(2) Date: Jun. 25, 2020

(87) PCT Pub. No.: WO2019/129540
PCT Pub. Date: Jul. 4, 2019

(65) Prior Publication Data
US 2021/0071046 A1 Mar. 11, 2021

(30) Foreign Application Priority Data
Dec. 27, 2017 (DE) ...................... 10 2017 131 347.8

(51) Int. Cl.
*C09J 9/00* (2006.01)
*B29C 39/02* (2006.01)
(Continued)

(52) U.S. Cl.
CPC ............... *C09J 9/00* (2013.01); *B29C 39/026* (2013.01); *B29C 39/10* (2013.01); *B29C 2045/0094* (2013.01); *C09J 2301/31* (2020.08)

(58) Field of Classification Search
CPC .......... C09J 2301/31; C09J 9/00; B32B 3/30; B32B 3/02; B32B 5/145; B32B 2307/546;
(Continued)

(56) References Cited

U.S. PATENT DOCUMENTS 7,700,179 B2 * 4/2010 Travis ...................... B32B 3/00
428/156
8,398,909 B1 3/2013 Sitti et al.
(Continued)

FOREIGN PATENT DOCUMENTS

DE 102014119470 A1 6/2016
JP 2006039450 A 2/2006
(Continued)

OTHER PUBLICATIONS

Machine Translation of Description of WO-2015015829-A1 (Year: 2015).*
(Continued)

*Primary Examiner* — Scott R. Walshon
(74) *Attorney, Agent, or Firm* — CAHN & SAMUELS, LLP (57) ABSTRACT

A structure with improved adhesion includes projections and a backing layer, the rigidity of the backing layer being variable, and the end faces defining a common surface.

19 Claims, 6 Drawing Sheets (51) Int. Cl.
*B29C 39/10* (2006.01)
*B29C 45/00* (2006.01)

(58) Field of Classification Search
CPC .................. B29C 39/10; B29C 39/026; B29C 2045/0094
See application file for complete search history.

(56) References Cited

U.S. PATENT DOCUMENTS

| | | | |
|---|---|---|---|
| 10,390,997 | B2 | 8/2019 | Tuma |
| 11,096,771 | B2 | 8/2021 | Arzt et al. |
| 11,359,658 | B2 | 6/2022 | Kroner et al. |
| 2005/0148984 | A1 | 6/2005 | Lindsay et al. |
| 2006/0005362 | A1 | 1/2006 | Arzt et al. |
| 2008/0280085 | A1 | 11/2008 | Livne |
| 2009/0053472 | A1* | 2/2009 | Spatz ............... B29C 59/025 264/293 |
| 2010/0136281 | A1 | 6/2010 | Sitti et al. |
| 2012/0107570 | A1 | 5/2012 | Ross et al. |
| 2018/0051187 | A1 | 2/2018 | Hensel et al. |
| 2018/0128943 | A1* | 5/2018 | Hibino ............... G02B 27/0018 |
| 2018/0223886 | A1 | 8/2018 | Kroner et al. |
| 2021/0062839 | A1 | 3/2021 | Arzt et al. |
| 2021/0071045 | A1 | 3/2021 | Arzt et al. |

FOREIGN PATENT DOCUMENTS

| | | | | |
|---|---|---|---|---|
| JP | 2008201883 | A | 9/2008 | |
| JP | 2012008419 | A | 1/2012 | |
| JP | 2012245748 | A | 12/2012 | |
| JP | 2016168063 | A | 9/2016 | |
| WO | 2008076391 | A2 | 6/2008 | |
| WO | WO-2015015829 | A1 * | 2/2015 | ............ A61M 25/09 |
| WO | 2016102264 | A1 | 6/2016 | |
| WO | 2016146792 | A1 | 9/2016 | |
| WO | 2019129476 | A1 | 7/2019 | |

OTHER PUBLICATIONS

Bacca, et al., "Load Sharing in Bioinspired Fibrillar Adhesives With Backing Layer Interactions and Interfacial Misalignment," Journal of the Mechanics and Physics of Solids, 96, 2016, 428-44.
International Search Report for Application No. PCT/EP2018/085499, dated Apr. 3, 2019.
International Preliminary Report of Patentability for Application No. PCT/EP2018/085499, dated Jul. 9, 2020.
English Abstract of WO 2019129476A1, Jul. 4, 2019.
English Abstract for JP2008201883 A, Sep. 4, 2008.
English Abstract for JP2012245748 A, Dec. 13, 2012.
English Abstract for JP2016168063 A, Sep. 23, 2016.
English Abstract of JP2012008419A, Jan. 12, 2012.
English Abstract of JP2006039450A, Feb. 9, 2006.
English Abstract of WO2016102264A1, Jun. 30, 2016.

* cited by examiner

STRUCTURE WITH IMPROVED ADHESION

This patent application is a U.S. national stage application of PCT international application PCT/EP2018/085499 filed on 18 Dec. 2018 and claims priority of German patent document 10 2017 131 347.8 filed on 27 Dec. 2017, the entireties of which are incorporated herein by reference.

FIELD OF THE INVENTION

The invention relates to a structure with improved adhesion to surfaces, in particular with improved force distribution.

BACKGROUND OF THE INVENTION

The molecular adhesion between two objects can be reinforced or controlled by fibrous surface structures. This principle is known as the gecko effect. If a structured elastomer surface is pressed against a comparatively flat surface with a certain contact force, van der Waals interactions can form. Reversible adhesion, i.e. the possibility of selectively switching between adhesion and detachment, is also known from nature. When using pillar-shaped adhesion structures, i.e. structures which consist of a multiplicity of pillar-shaped projections, the end faces of which form the contact surface for adhesion to a surface, detachment is generally initiated by the contact area with the surface being reduced by external influences.

Here, the strength of adhesion and the manner of detachment can be controlled by the structure of the dry-adhesive structure on the surface. In contrast to normal adhesive joints, this allows significantly greater control of the adhesion forces.

Precisely for uses in which objects have to be secured reversibly on certain surfaces, such structures can provide advantages.

One problem of such structures is that the tension forces in the structure are distributed laterally in a nonuniform manner over the individual projections when an object is lifted off. This is caused by deviations from a uniform force distribution (equal load sharing) due to elastic interactions in the backing layer to which all the projections are attached, or due to nonparallel alignment of the structure relative to the contacted surface (substrate). This significantly lowers adhesion relative to the value that is theoretically to be expected.

This unequal force distribution occurs especially if the structures are connected by an elastic or viscoelastic backing layer and is furthermore reinforced if the surface of the object has a convex curvature in the direction of the adhesion structures. The reason is the mechanical coupling of the structures via the deformable backing layer. This coupling differs in strength for structures at the edge and structures within the array: due to a smaller number of adjacent structures, the adhesion structures at the outer edge are subject to a greater load than the structures within the array. Due to the unequal loading, detachment/failure of the adhesion structures takes place starting from the edge. The degree to which this nonuniform distribution affects the efficiency and loadbearing capacity of the overall adhesion structure depends on the number of structures which are subject to stress in an array. In general, it is the case that the efficiency of an adhesion structure array decreases with an increasing number of structures participating in adhesion. That is to say that large arrays are less efficient than small ones.

The actual efficiency can be determined by means of numerical methods.

A scientific analysis of the problem was published by Bacca, Booth, Turner and McMeeking (Bacca et al. Journal of the Mechanics and Physics of Solids 2016, 96, 428-444, Load sharing in bioinspired fibrillar adhesives with backing layer interactions and interfacial misalignment). The authors emphasize that uniform force distribution can be achieved by adjusting the elasticity of the individual fibers, by modulating either the elastic modulus or the height of the projections. However, it is necessary here to avoid clumping together of the projections.

The problem addressed by the invention is to provide a structure which has improved adhesion and, in particular, improved force distribution.

SUMMARY OF THE INVENTION

This problem is solved by the inventions having the features of the independent claims. Advantageous developments of the inventions are indicated in the dependent claims. The wording of all the claims is thereby incorporated by reference into this description. The inventions also include all worthwhile and, in particular, all mentioned combinations of independent and/or dependent claims.

The invention is indicated by a structure comprising a backing layer, a multiplicity of projections on said backing layer, wherein each projection has an end face, wherein all the end faces define a common surface and the stiffness of the backing layer varies, preferably decreases, in the direction of at least one edge of the structure.

A decrease in the stiffness toward the edge of up to 50%, based on the highest stiffness, preferably of up to 30%, in particular a change in the stiffness by at least 2%, is preferred.

The variation of the stiffness of the backing layer ensures that the coupling between the projections via the backing layer changes toward the edge. The adhesion of the structure is thereby significantly improved.

In a preferred embodiment, the stiffness of the backing layer decreases in the direction of all the edges of the structure. An edge of a structure is interpreted to mean the end of the arrangement of projections on the backing layer. The backing layer preferably has a gradient of the stiffness in the direction of the edges parallel to the adhesion surface.

The change in the stiffness can be achieved in different ways. In one embodiment of the invention, this change is achieved by a decrease in the thickness of the backing layer in the direction of at least one edge of the structure.

Since the end faces of the projections define a common surface, the variation of the thickness of the backing layer ensures that the projections are shorter in the center of the structure, while the length of the projections increases toward the edge, wherein the end faces of the projections are still suitable for making contact with flat surfaces since the end faces define a common surface.

The thickness of the backing layer decreases in the direction of at least one edge of the structure, preferably in the direction of at least two edges, in particular toward all the edges. This can be achieved by means of an arched shape of the backing layer, for example. Alternatively, it is also possible that the structure has a constant thickness of the backing layer in the center, and that the thickness of the backing layer decreases only toward the edge, e.g. in the last quarter, measured by the diameter of the structure.

This modification of the backing layer also ensures that relatively large objects can be gripped and released not by large adhesion structure arrays that are difficult to produce but, as an alternative, by a multiplicity of smaller adhesion structure arrays and, in this case, the edge effects on the smaller arrays reduce the adhesion force hardly at all.

If the thickness decreases toward the edge, this should be interpreted to mean that the thickness decreases at least in the region at the edge. This means that the thickness of the backing layer decreases continuously in each case at the edge of the structure. The resulting structure has longer projections at the edges in comparison with the center of the backing layer.

This structure ensures that the structure is also suitable for adhesion to flat surfaces and yet has an improved force distribution.

During the intended detachment for the purpose of positioning objects, it is furthermore ensured that detachment begins first of all at the edge and then progresses inward. Controlled detachment with improved local precision is thereby achieved.

In another embodiment of the invention, the change in the stiffness is achieved by a corresponding change in the elastic modulus of the backing layer. This can be accomplished by means of a gradient within the material. This is preferably achieved by virtue of the fact that the backing layer has at least two regions of different elastic moduli. In this case, the backing layer is, in particular, built up on the extent of the individual regions in such a way that a difference in the adhesive force of the structure is achieved.

In a preferred embodiment, these regions are designed as layers, in particular as layers of which the vertical thickness varies.

As a result, the stiffness of the backing layer at a particular point is dependent on the ratio of the different layers. The stiffness of the backing layer can be controlled by means of the thickness of the respective layers.

In a preferred embodiment, the vertical proportion of regions with a high elastic modulus decreases toward the edge, with the result that the stiffness falls. This means that the thickness of the layers changes accordingly.

The use of a plurality of layers has the advantage that the length of the projections can remain constant, making the production and stability of the structures easier. At the same time, it is easier to produce the backing layer as a plurality of layers, facilitating the adaptation of the stiffness to different uses.

In one embodiment of the invention, the backing layer comprises 2, 3 or 4 layers of different elastic moduli, preferably 2 layers of different elastic moduli.

The layers do not have to extend over the entire area of the backing layer. The layers preferably extend over the entire area of the structure.

The outermost layer can also be connected firmly to a support or can be part of a support of the structure according to the invention. It is important that it has an effect on the adhesion force of the structure.

In a preferred embodiment, the backing layer has a first layer, on which the projections are arranged. A second layer is arranged underneath this layer. Both layers have a common boundary surface. If the elastic modulus of the first layer is higher than that of the second layer, the thickness of the second layer preferably decreases in the direction of at least one edge, while the thickness of the first layer increases. This can be achieved, for example, by the fact that the boundary surface of the two layers is arched, i.e. is convex, in the direction of the projections. If the elastic modulus of the second layer is higher, the situation is reversed, i.e. the boundary surface is of correspondingly concave shape, and the thickness of the second layer increases accordingly.

A convex boundary surface is preferred. The boundary surface is preferably parabolic, hemispherical to cup- or trough-shaped. As a particular preference, the curvature of the boundary surface is described by a straight polynomial (polynomial function with even-numbered exponents).

In a preferred embodiment of the invention, the thickness of the backing layer, based on all the layers, is constant.

In a preferred embodiment, the elastic modulus of the first layer corresponds to the elastic modulus of the projections.

The elastic modulus of the backing layer is preferably 50 kPa to 3 GPa. The elastic modulus is preferably 50 kPa to 5 GPa, in particular 100 kPa to 1 GPa, particularly preferably 500 kPa to 100 MPa.

In the case of a plurality of layers, the elastic modulus of at least one layer is 50 kPa to 3 GPa. The elastic modulus is preferably 50 kPa to 5 GPa, in particular 100 kPa to 1 GPa, particularly preferably 500 kPa to 100 MPa. The elastic modulus of at least one layer is preferably 50 kPa to 20 MPa, preferably 100 kPa to 10 MPa.

Irrespective of this, the elastic modulus of the at least one layer with a high elastic modulus is at least 1 MPa, in particular 1 MPa to 3 GPa, preferably 2 MPa to 1 GPa.

The ratio of the elastic moduli of the layer with the lowest elastic modulus to the layer with the highest elastic modulus is preferably over 1:2, preferably over 1:100, in particular over 1:500, very particularly preferably over 1:1000, in particular over 1:1500. Such large differences have a particularly advantageous effect.

The thickness of the backing layer can be chosen to match the use. Depending on the height of the projections, the maximum thickness can be up to 5 cm, preferably up to 3 cm. It can also be less than 1 cm, for example less than 5 mm.

The thickness is chosen so that a corresponding improvement in the adhesion force is achieved, even if the thickness varies. A variation in the thickness by up to 50%, starting from the maximum thickness, preferably by up to 30%, in particular by at least 5%, is preferred.

In the case of a plurality of layers, the thickness is chosen so that an improvement in the adhesion force is also achieved. In the case of a plurality of layers, the thickness at least of two layers varies in order to change the stiffness, preferably by at least 2% relative to the maximum thickness of the backing layer, preferably by at least 5%, preferably by at least 30%.

In this context, the thickness of a layer can be 0 if it is not in this range.

In the case of the layer with the lowest elastic modulus, it is preferred that its minimum thickness (d) in relation to the perpendicular height of the projections (L) is less than 1, preferably if it is the layer on which the projections are arranged.

These are preferably structures which comprise a multiplicity of projections (pillars) that each have at least one stem and an end face facing away from the surface. By means of this end face, the projections come into contact with the surface to which they are supposed to adhere.

The perpendicular height of the end face is interpreted to mean the distance between the end face and the surface on which the projections are arranged.

In a preferred embodiment of the invention, the projections of each structure of the invention are of pillar-type design. This means that they are projections which are preferably formed perpendicularly to the surface and which have a stem and an end face, wherein the stem and the end face can have any desired cross section (e.g. circular, oval, rectangular, square, diamond, hexagonal, pentagonal, etc.).

The projections are preferably designed in such a way that the vertical projection of the end face onto the base area of the projection forms an area of overlap with the base area, wherein the area of overlap and the projection of the area of overlap onto the end face define a body which is completely within the projection. In a preferred embodiment of the invention, the area of overlap comprises at least 50% of the base area, preferably at least 70% of the base area, and, particularly preferably, the area of overlap comprises the entire base area. The projections therefore preferably do not slope.

In a preferred embodiment, the end face is aligned parallel to the base area and to the surface. If the end faces are not aligned parallel to the surface and therefore have different perpendicular heights, the average perpendicular height of the end face is regarded as the perpendicular height of the projection.

In one embodiment, the end face of the projections is larger than the base area, so-called "mushroom" structures.

In a preferred embodiment of the invention, the stem of the projection has an aspect ratio of height to diameter of 0.5 to 100, preferably of 1 to 10, particularly preferably between 1 and 5, based on its mean diameter.

In this context, the mean diameter is interpreted to mean the diameter of the circle which has the same area as the corresponding cross section of the projection, averaged over the total height of the projection.

The end faces define a common surface. This is interpreted to mean that the end faces can be part of a continuous area, e.g. a plane. This can also be a curved surface.

The end faces of the projections can themselves be structured in order to increase the surface area thereof. In this case, the mean perpendicular height of the end face is regarded as the perpendicular height of the projections.

In a preferred embodiment, the perpendicular height of all the projections is in a range of from 1 μm to 10 mm, preferably 1 μm to 5 mm, in particular 1 μm to 2 mm, preferably in a range of from 1 μm to 1 mm.

In a preferred embodiment, the base area corresponds, as regards area, to a circle with a diameter of between 0.1 μm to 5 mm, preferably 0.1 μm and 2 mm, particularly preferably between 1 μm and 500 μm, particularly preferably between 1 μm and 100 μm. In one embodiment, the base area is a circle with a diameter of between 0.3 μm and 2 mm, preferably 1 μm and 100 μm.

The mean diameter of the stems is preferably between 0.1 μm and 5 mm, preferably 0.1 μm and 2 mm, particularly preferably between 1 μm and 100 μm. The height and the mean diameter are preferably adapted to correspond to the preferred aspect ratio.

In a preferred embodiment, in the case of widened end faces, the surface area of the end face of a projection is at least 1.01 times, preferably at least 1.5 times, as large as the area of the base area of a projection. It can be greater by a factor of 1.01 to 20, for example, or 1.05 to 2 times greater, for example.

In another embodiment, the end face is between 5% and 100% larger than the base area, particularly preferably between 10% and 50% larger than the base area.

In a preferred embodiment, the distance between two projections is less than 2 mm, in particular less than 1 mm.

The projections are preferably arranged periodically in a regular manner.

The elastic modulus of the projections is preferably 50 kPa to 3 GPa. The elastic modulus is preferably 50 kPa to 5 GPa, in particular 100 kPa to 1 GPa, particularly preferably 500 kPa to 100 MPa.

The materials of the projections and of the backing layer can be chosen freely to match the requirements of a person skilled in the art. The projections can comprise the following materials, for example:
epoxy- and/or silicone-based elastomers, thermoplastic elastomers (TPE), polyurethanes, epoxy resins, acrylate systems, methacrylate systems, polyacrylates as homo- and co-polymers, polymethacrylates as homo- and co-polymers (PMMA, AMMA acrylonitrile/methyl methacrylate), polyurethane (meth)acrylates, silicones, silicone resins, rubber, such as R rubber (NR natural rubber, IR polyisoprene rubber, BR butadiene rubber, SBR styrene butadiene rubber, CR chloroprene rubber, NBR nitrile rubber), M rubber (EPM ethene propene rubber, EPDM ethylene propylene rubber), unsaturated polyester resins, formaldehyde resins, vinylester resins, polyethylenes as homo- or co-polymers, as well as mixtures and copolymers of the abovementioned materials. Elastomers which are permitted by the EU for use in the packaging, pharmaceuticals and food sectors (EU Directive No. 10/2011 of 14.01.2011, published on 15 Jan. 2011) or the FDA or silicone-free UV-curable resins from PVD and CVD process engineering are also preferred. In this context, polyurethane (meth)acrylates stand for polyurethane methacrylates, polyurethane acrylates, as well as mixtures and/or copolymers thereof.

Epoxy- and/or silicone-based elastomers, polyurethane (meth)acrylates, polyurethanes, silicones, silicone resins (such as UV-curable PDMS), polyurethane (meth)acrylates or rubber (such as EPM, EPDM) are preferred.

The backing layer is preferably likewise composed of one of the above materials, particularly preferably of the same material as the projections.

In the case of a plurality of regions, at least one region is composed of the abovementioned materials. The layers with a higher elastic modulus can also be composed of other materials, such as plastics, metals, ceramics, preferably of plastics such as thermosets or thermoplastics, such as polystyrene, acrylonitrile butadiene styrene, polylactides, polyvinyl alcohol, polyamides, such as polyamide PA 66. Plastics which can be applied by injection molding or 3-D printing are preferred.

The structures according to the invention are preferably produced by casting.

The invention also relates to a method for producing a structure according to the invention. For this purpose, a mold is provided which comprises a negative structure of the structure comprising projections and a backing layer of varying thickness. The mold is correspondingly filled with a curable precursor for the material of the backing layer and the projections. Depending on the material used, the precursor is then cured, a process which can be accomplished physically and/or chemically. Examples are heating or irradiation, e.g. with UV. The structure is removed from the mold and possibly subjected to further processing steps.

The invention also relates to a method for producing a structure according to the invention, in which the backing layer comprises at least two regions. For this purpose, a mold is provided, which comprises a negative structure of the structure comprising the projections and the backing layer. Moreover, a further body is provided, which corresponds in its dimensions to a region of the backing layer to be produced. This body can be arranged on a support or can be a part thereof.

In the next step, a curable precursor is introduced into the mold. In a next step, the further body is introduced into the mold in such a way that, together with the precursor, it forms the subsequent backing layer. In this case, it is possible that the body will partially deform and/or displace the precursor, e.g. if it has an arched structure. After curing, the precursor and the body form the backing layer. Since the body is pressed into the precursor, it can also be referred to as an inlet. The body is preferably composed of a material with a higher elastic modulus than the material in the casting mold after curing.

The precursor is then cured. The projections and the first region are thereby formed.

The structure is then removed from the casting mold. The backing layer is formed by the cast structure and the further body. The further body forms the second region of the backing layer.

The further body can also already comprise a plurality of regions with different elastic moduli.

The further body can be produced in various ways. It is possible to produce it by 3-D printing, for example. By means of the method according to the invention, the shape of the individual regions of the backing layer can be defined in a simple manner. In particular, the production of the projections and of the final structure can be carried out in one step. By the prior production of the further body, it is possible to obtain geometries which are not possible by sequential casting methods.

The further body is preferably concavely arched and has the greatest thickness in the center thereof.

Precisely in the case of very small and sensitive components, such as microchips, integrated circuits, displays or touchscreens, the structure according to the invention offers possibilities for precise handling without large loads on the object. Thus, by improving adhesion, it is possible to work with adhesion structures of relatively small extent. The area required for adhesion is significantly smaller.

The invention therefore also relates to the use of the structure according to the invention for dry adhesion, in particular for handling or securing objects by dry-adhesive adhesion.

Further details and features will become apparent from the following description of preferred exemplary embodiments in conjunction with the dependent claims. In this case, the respective features can be implemented individually or jointly in combination. The possibilities of solving the problem are not restricted to the exemplary embodiments. Thus, range indications, for example, always include all—unmentioned—intermediate values and all conceivable partial intervals.

The exemplary embodiments are illustrated schematically in the figures. Here, identical reference numerals in the individual figures denote elements which are identical or functionally identical or correspond to one another in respect of their functions. More specifically:

DETAILED DESCRIPTION OF THE DRAWINGS

Figure 1:
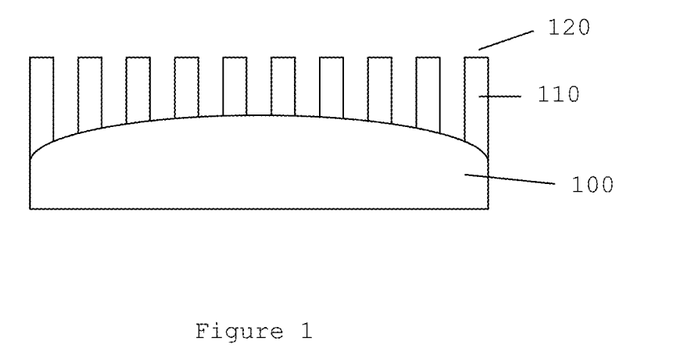
FIG. 1 shows a schematic illustration of one embodiment of the invention.

FIG. 1 shows a schematic illustration of a structure according to the invention. A multiplicity of projections 110, which each have end faces 120, is arranged on a backing layer 100. In this embodiment, the surface of the backing layer without the projections is convexly curved.

Figure 2:
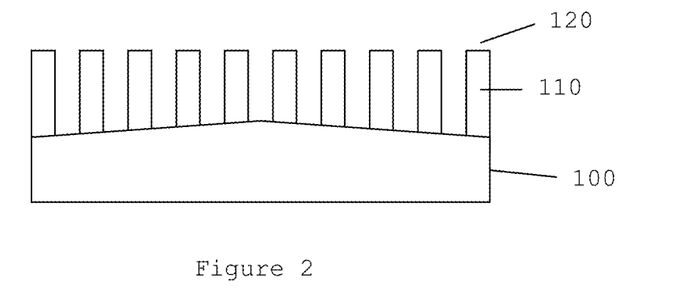
FIG. 2 shows a schematic illustration of one embodiment of the invention.

FIG. 2 shows a schematic illustration of a structure according to the invention. A multiplicity of projections 110, which each have end faces 120, is arranged on a backing layer 100. In this embodiment, the surface of the backing layer without the projections is roof-shaped or cone-shaped. It is also possible for the thickness of the backing layer to decrease in only one dimension. In this case, the surface of the backing layer without the projections is shaped in the manner of a gable.

Figure 3:
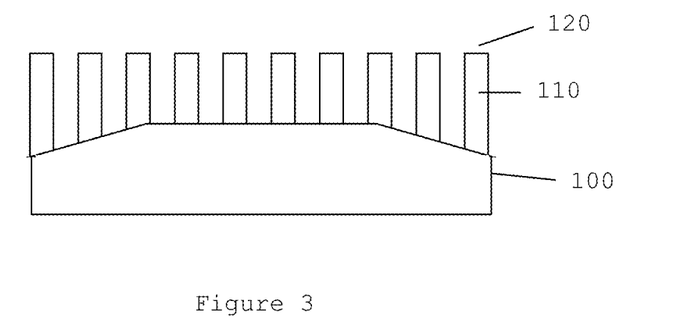
FIG. 3 shows a schematic illustration of one embodiment of the invention.

FIG. 3 shows a schematic illustration of a structure according to the invention. A multiplicity of projections 110, which each have end faces 120, is arranged on a backing layer 100. In this embodiment, the thickness of the backing layer in the center of the structure is constant and decreases only toward the edges.

Figure 4:
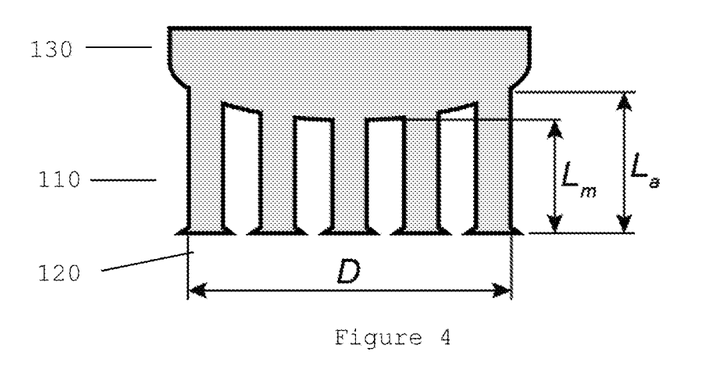
FIG. 4 shows a schematic illustration of one embodiment of the invention with an arched backing layer.

FIG. 4 shows a schematic illustration of a structure according to the invention with an arched backing layer 130, on which projections 110 are arranged. The end faces of the projections 120 are at the same height and thus define a plane. The height of the projections therefore varies across the width of the structure D from the minimum height $L_m$ in the center to the maximum height $L_a$ at the edge of the structure.

Figure 5:
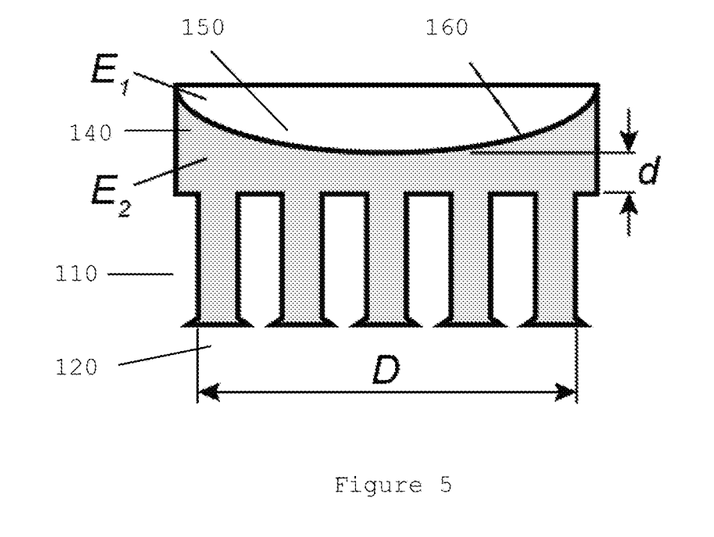
FIG. 5 shows a schematic illustration of one embodiment of the invention with a multi-layer backing layer.

FIG. 5 shows a schematic illustration of a structure according to the invention with a multi-layer structure of the backing layer. The backing layer has a first region 140 with an elastic modulus $E_2$. The projections 110 are arranged on this region. The backing layer also has a second region 150 with an elastic modulus $E_1$. Here, $E_1 > E_2$. Both regions 140, 150 are designed as layers and are arranged one on top of the other. The boundary surface 160 thereof has a concave curvature in the direction of the projections. As a result, the first region has a minimum thickness of d in the center of the structure. The thickness of the second region is also greatest there. Toward the two edges, the thickness of the first region increases, while the thickness of the second region decreases. If the boundary surface has a concave curvature in all directions, the stiffness of such a body increases toward all the edges. In this case, the second region extends over the entire width D of the structure. The ratio of the minimum thickness d to the height of the projections is preferably less than 1.

Figure 6:
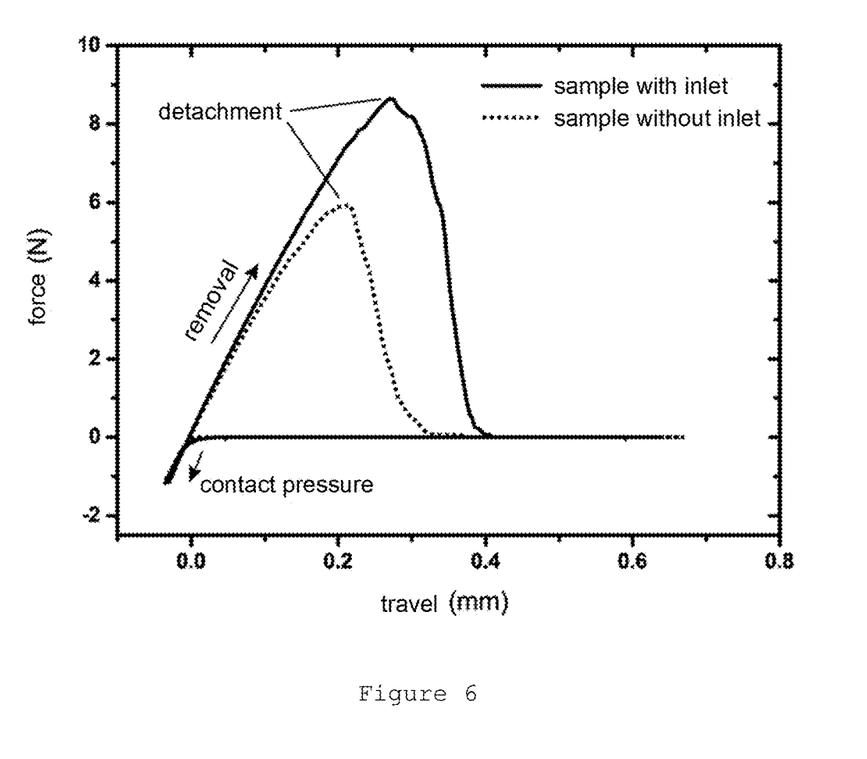
FIG. 6 shows the measurement of the adhesion force of various structures.

FIG. 6 shows the measurement of the adhesion force of various structures on a glass surface. After making contact with the surface, the samples are moved perpendicularly toward the surface until a preliminary load is reached ("contact pressure") and are then moved away from the surface again until there is complete detachment (travel in mm, "removal"). During this process, the forces acting on the structure and the surface in the direction of motion are measured. The removal force required during this process is the force which is required for complete detachment. The measurement shows clearly that a significantly higher force is necessary to detach a structure with two layers, as shown in FIG. 7 (sample with inlet), than for a sample produced with the same dimensions but without a multi-layer backing layer (sample without inlet).

Figure 7:
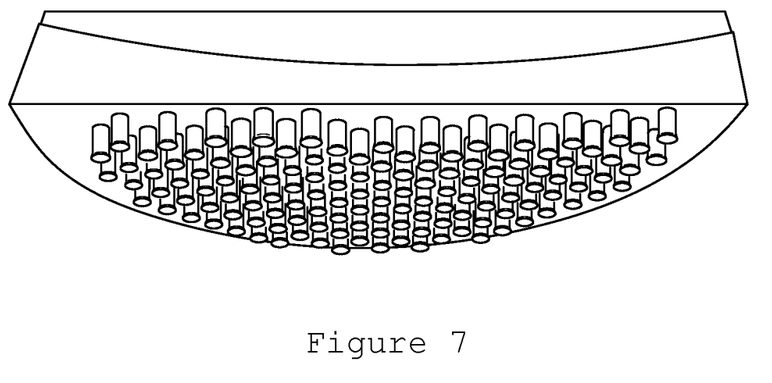
FIG. 7 shows a depiction of a structure according to the invention in cross section.

FIG. 7 shows a structure with projections on a backing layer. The structure has been cut in half, revealing the cross section. The projections have a circular diameter and are arranged periodically in a regular manner. They are arranged on a backing layer comprising two regions, which are in turn designed as layers. It is clearly apparent that the thickness of the first region with the projections in the center is the smallest. The second region forms a layer below the first region. The concavely curved boundary surface is clearly apparent. The height of the backing layer is known over the entire structure. Only the thickness of the two layers varies.

Figure 8:
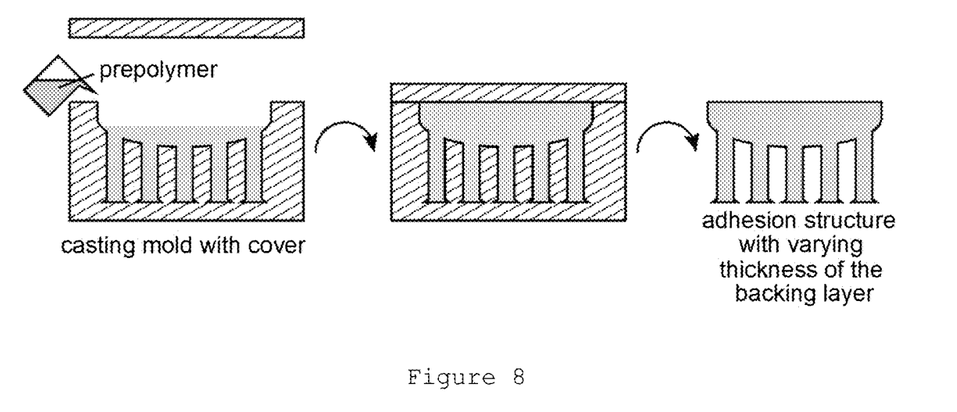
FIG. 8 shows a schematic illustration of the production of a structure according to the invention.

FIG. 8 shows schematically the production of a structure according to the invention with a varying thickness of the backing layer. A corresponding casting mold is provided (on the left). The prepolymer for the material is introduced into said mold, and the mold is closed by means of a cover (central illustration). During this process, the mold is completely filled. In the next step, the prepolymer is cured, e.g. cross-linked. After removal from the casting mold (on the right), the structure according to the invention is obtained.

Figure 9:
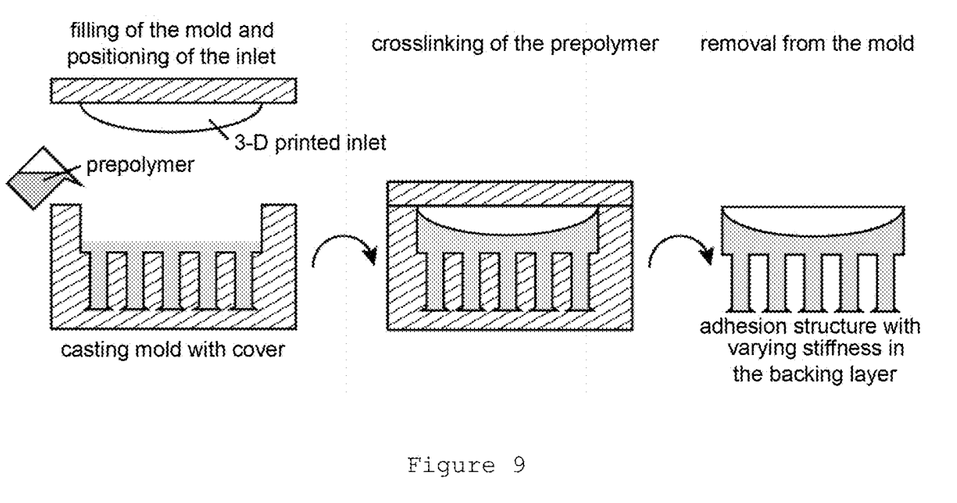
FIG. 9 shows a schematic illustration of the production of a structure according to the invention.

FIG. 9 shows schematically the production of a structure according to the invention with a multi-layer backing layer. In this process, a casting mold for the entire structure is provided. The prepolymer is introduced into this mold (on the left). The prepolymer is the precursor for the material of the projections and the first region of the backing layer. An inlet is furthermore provided on a support. This inlet can be produced by 3-D printing, for example. It is arranged on a support, which can also form the cover of the casting mold. The amount of prepolymer introduced into the mold is such that the mold is completely filled after the introduction of the inlet (central illustration) into the mold. The prepolymer is then cured, and the structure is removed from the mold (on the right). In this way, a structure with a multi-layer backing layer is obtained.

Figure 10:
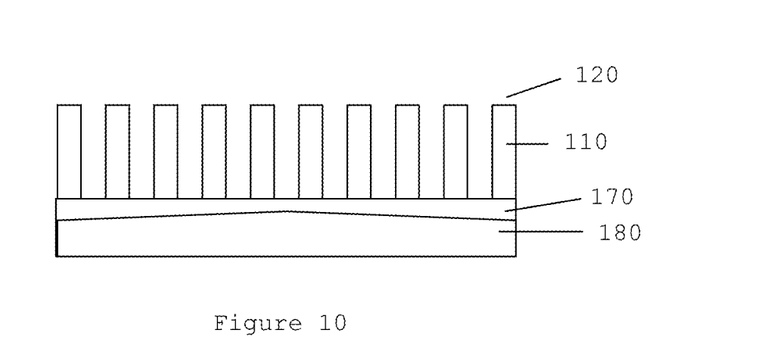
FIG. 10 shows a schematic illustration of one embodiment of the invention with a multi-layer backing layer.

FIG. 10 shows an embodiment of the invention with a multilayer backing layer comprising a first region 170 and a second region 180. The projections 110 with end faces 120 are arranged on the first region. The change in the stiffness is achieved by virtue of the fact that the thickness of the first region 170 is least in the center and increases continuously in linear fashion toward the edge. The thickness of the second region 180 decreases in corresponding fashion. In this case, the boundary surface is roof-shaped or cone-shaped, depending on the three-dimensional design of the structure.

Figure 11:
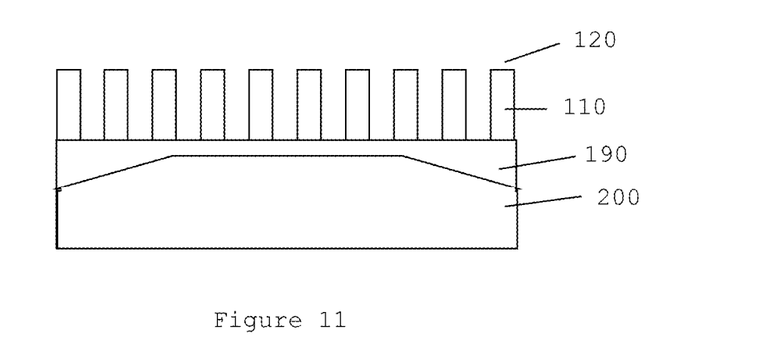
FIG. 11 shows a schematic illustration of one embodiment of the invention with a multi-layer backing layer.

FIG. 11 shows an embodiment of the invention with a multilayer backing layer comprising a first region 190 and a second region 200. The projections 110 with end faces 120 are arranged on the first region. The change in the stiffness is achieved by virtue of the fact that the thickness of the first region 190 is least in the center, first of all remains constant and then increases continuously in linear fashion toward the edge. The thickness of the second region 200 decreases in corresponding fashion. In this case, the boundary surface is roof-shaped with a cut-off gable or similar to a truncated cone, depending on the three-dimensional design of the structure.

REFERENCE SIGNS

100 backing layer
110 projection
120 end face
130 backing layer
140 first region of the backing layer
150 second region of the backing layer (inlet)
160 boundary surface
170 first region of the backing layer
180 second region of the backing layer (inlet)
190 first region of the backing layer
200 second region of the backing layer

The invention claimed is:

1. A structure comprising:
a backing layer,
a multiplicity of projections on said backing layer,
wherein each projection has an end face, wherein all the end faces define a common surface,
wherein a stiffness of the backing layer varies in the direction of at least one edge of the structure,
wherein the backing layer decreases in thickness in a direction of at least one edge of the structure so that projections in a center of the backing layer are shorter in length than projections towards the edge of the structure.

2. The structure as claimed in claim 1, wherein the stiffness of the backing layer decreases in the direction of at least one edge of the structure.

3. The structure as claimed in claim 1, wherein the thickness of the backing layer decreases in the direction of all edges of the structure.

4. The structure as claimed in claim 1, wherein the thickness of the backing layer decreases continuously in the region of the edge of the structure.

5. The structure as claimed in claim 1, wherein the backing layer has at least two regions of different elastic moduli.

6. The structure as claimed in claim 5, wherein the regions are designed as layers, each layer extending an entire area of the structure.

7. The structure as claimed in claim 1, wherein the projections are in the form of pillars.

8. The structure as claimed in claim 1, wherein the backing layer comprises two layers having a different vertical thickness.

9. The structure as claimed in claim 1, wherein the backing layer has a constant thickness in a center region and decreases from the center region towards an edge of the structure.

10. The structure as claimed in claim 1, wherein each stem of a projection has an aspect ratio of height to diameter of 1 to 10.

11. The structure as claimed in claim 1, wherein the backing layer comprises the same material as the plurality of projections.

12. The structure as claimed in claim 1, wherein the backing layer comprises an epoxy-based elastomer, a silicon-based elastomer, or a thermoplastic elastomer.

13. The structure as claimed in claim 1, wherein the structure is a dry adhesive.

14. A structure comprising:
a backing layer;
a multiplicity of projections on said backing layer;
wherein each projection has an end face, wherein all the end faces define a common surface,
wherein a stiffness of the backing layer varies in the direction of at least one edge of the structure, and
wherein the backing layer comprises:
a first layer on which the projections are arranged; and
a second layer underneath the first layer,
wherein the elastic modulus of the first layer is higher than that of the second layer, and
wherein a thickness of the second layer decreases in a direction of a least one edge of the backing layer,
wherein a common boundary between the first layer and the second layer is convex in a direction of the projections, and
wherein a ratio of the elastic modulus of the second layer to that of the first layer is over 1:100.

15. The structure as claimed in claim 14, wherein the layer of the higher elastic modulus comprises plastic.

16. A structure comprising:
a backing layer,
a multiplicity of projections on said backing layer,
wherein each projection has an end face, wherein all the end faces define a common surface,
wherein a stiffness of the backing layer varies in the direction of at least one edge of the structure,
wherein the backing layer comprises:
a first layer on which the projections are arranged; and
a second layer underneath the first layer,
wherein the elastic modulus of the second layer is higher than that of the first layer,
wherein a thickness of the second layer increases in a direction of a least one edge of the backing layer,
wherein a common boundary between the first layer and the second layer is concave in a direction of the projections, and
wherein a ratio of the elastic modulus of the first layer to that of the second layer is over 1:100.

17. The structure as claimed in claim 16, wherein the layer of the higher elastic modulus comprises plastic.

18. A method for producing a structure as claimed in claim 5, comprising:
providing a mold, which comprises the negative structure of the structure comprising the projections and the backing layer;
providing a further body, which corresponds in its dimensions to a region of the backing layer to be produced;
introducing a curable precursor into the mold;
introducing the further body into the mold;
curing the precursor; and
removing the structure from the mold.

19. A method of dry adhesion comprising contacting the structure as claimed in claim 1 with an object for handling or securing the object.

* * * * *